(12) United States Patent
Okudaira et al.

(10) Patent No.: US 10,873,249 B2
(45) Date of Patent: Dec. 22, 2020

(54) RESIN FILLING METHOD AND RESIN FILLING DEVICE FOR MAGNET EMBEDDED CORE

(71) Applicant: KURODA PRECISION INDUSTRIES LTD., Kanagawa (JP)

(72) Inventors: Hironobu Okudaira, Kanagawa (JP); Tomoaki Murayama, Kanagawa (JP); Osamu Fukuyama, Kanagawa (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 589 days.

(21) Appl. No.: 15/555,291

(22) PCT Filed: Mar. 13, 2015

(86) PCT No.: PCT/JP2015/001418
§ 371 (c)(1),
(2) Date: Sep. 1, 2017

(87) PCT Pub. No.: WO2016/147211
PCT Pub. Date: Sep. 22, 2016

(65) Prior Publication Data
US 2018/0062488 A1    Mar. 1, 2018

(51) Int. Cl.
*H02K 15/03*  (2006.01)
*H02K 1/27*   (2006.01)
(Continued)

(52) U.S. Cl.
CPC ......... *H02K 15/03* (2013.01); *B29C 45/0025* (2013.01); *B29C 45/14065* (2013.01); *B29C 45/14639* (2013.01); *B29C 45/2708* (2013.01); *H02K 1/27* (2013.01); *H02K 1/276* (2013.01); *H02K 1/2766* (2013.01); *H02K 15/12* (2013.01); *B29C 2045/0027* (2013.01);
(Continued)

(58) Field of Classification Search
None
See application file for complete search history.

(56) References Cited

U.S. PATENT DOCUMENTS

2014/0103574 A1*  4/2014  Ishimatsu ......... B29C 45/14065
                                                          264/261

FOREIGN PATENT DOCUMENTS

| JP | H 09149570 | 6/1997 |
| JP | 2002247784 | 8/2002 |

(Continued)

OTHER PUBLICATIONS

International Search Report for PCT/JP2015/001418 dated Apr. 28, 2015, 4 pages.

*Primary Examiner* — Monica A Huson
*Assistant Examiner* — Kelsey C Grace
(74) *Attorney, Agent, or Firm* — Dority & Manning, P.A.

(57) ABSTRACT

A resin filling method for a magnet embedded core includes: a fixing step of sandwiching the laminated iron core at axial ends thereof between a first mold and a second mold provided to face each other; and a resin injecting step of injecting a resin into the magnet insertion hole from a resin injecting portion provided in the first mold or the second mold, wherein in the resin injecting step, an end portion of the resin injecting portion is inserted into the magnet insertion hole beyond an axial end surface of the permanent magnet inserted in the magnet insertion hole.

9 Claims, 10 Drawing Sheets

(51) Int. Cl.
    *B29C 45/27*     (2006.01)
    *B29C 45/00*     (2006.01)
    *B29C 45/14*     (2006.01)
    *H02K 15/12*     (2006.01)
    B29L 31/00     (2006.01)
    B29L 31/34     (2006.01)

(52) U.S. Cl.
    CPC ... *B29C 2045/0036* (2013.01); *B29L 2031/34* (2013.01); *B29L 2031/749* (2013.01)

(56) References Cited

FOREIGN PATENT DOCUMENTS

| | | |
|---|---|---|
| JP | 2008042967 | 2/2008 |
| JP | 2008182824 | 8/2008 |
| JP | 2011172347 | 9/2011 |
| JP | 2014036486 | 2/2014 |
| JP | 2014096932 | 5/2014 |

\* cited by examiner

RESIN FILLING METHOD AND RESIN FILLING DEVICE FOR MAGNET EMBEDDED CORE

TECHNICAL FIELD

The present invention relates to a resin filling method and a resin filling device for a magnet embedded core in which permanent magnets inserted in magnet insertion holes of a motor core are embedded with a resin.

BACKGROUND ART

Conventionally, as a core for motors used in automobiles, electric appliances or the like, a magnet embedded core, in which permanent magnets accommodated in magnet insertion holes formed in a laminated iron core are embedded with a resin, is widely used.

With regard to the magnet embedded core of this kind, it is desired that the permanent magnets can be reliably fixed without deteriorating the properties of the permanent magnets. To meet such demands, as a manufacturing method for a magnet embedded core, for example, a method is known in which after the permanent magnets are inserted into the magnet insertion holes, a mixture of soft magnetic powder and resin is injected and filled into the magnet insertion holes to fix the positions of the permanent magnets (for example, see Patent Document 1).

PRIOR ART DOCUMENT(S)

Patent Documents(S)

Patent Document 1: JP2008-182824A

SUMMARY OF THE INVENTION

Task to be Accomplished by the Invention

Incidentally, in the conventional technology described in aforementioned Patent Document 1, in the step of embedding the permanent magnets with a resin, a gate for injecting and the mixture of soft magnetic powder and resin is positioned at an axial end of each magnet insertion hole.

However, in the configuration of the aforementioned conventional technology, there is a problem that a burr (resin residue at the gate) protruding more outward than the axial end surface of the laminated iron core (motor core) is formed at the gate position after the injection. If such a burr is left remaining, the burr may adversely affect an operation of the motor by interfering with a part of the motor or dropping off from the motor core during assembly of the motor. Therefore, a work for removing the burr may become necessary after the resin is filled.

The present invention is made in view of such problems in the prior art, and a primary object thereof is to provide a resin filling method and a resin tilling device for a magnet embedded core, that allow a permanent magnet to be fixed accurately in a magnet insertion hole by filling a resin, and suppress generation of a burr protruding more outward than an axial end surface of a laminated iron core after the resin is filled.

Means to Accomplish the Task

According to a first aspect of the present invention, there is provided a resin filling method for a magnet embedded core (1), for embedding a permanent magnet (4) inserted in a magnet insertion hole (3) provided in a laminated iron core for a motor core with a resin, the method comprising: a fixing step of sandwiching the laminated iron core at axial ends thereof between a first mold (21) and a second mold (22) disposed to face each other; and a resin injecting step of injecting the resin into the magnet insertion hole from a resin injecting portion (47) provided in the first mold or the second mold, wherein in the resin injecting step, an end portion (47a) of the resin injecting portion is inserted into the magnet insertion hole beyond an axial end surface (4a) of the permanent magnet inserted in the magnet insertion hole.

In the resin filling method for a magnet embedded core according to the first aspect, because the end portion of the resin injecting portion is inserted into the magnet insertion hole beyond the axial end surface of the permanent magnet inserted in the magnet insertion hole, a direct flow of the resin from the end portion of the injecting portion to the axial end surface of the permanent magnet is suppressed, whereby the permanent magnet can be fixed accurately in the magnet insertion hole. In addition, generation of a burr protruding more outward than the axial end surface of the laminated iron core after the resin is filled can be suppressed.

According to a second aspect of the present invention, with regard to the aforementioned first aspect, the end portion of the resin injecting portion is provided to protrude from the first mold or the second mold, and abuts against a side surface (4d) of the permanent magnet in the resin injecting step.

In the resin filling method for a magnet embedded core according to the second aspect, because movement of the permanent magnet in the magnet insertion hole when the resin is filled is restricted by the end portion of the resin injecting portion, the permanent magnet can be fixed in the magnet insertion hole even more accurately.

According to a third aspect of the present invention, with regard to the aforementioned first or second aspect, the magnet insertion hole includes a magnet accommodating portion (11) formed to conform to an outer shape of the permanent magnet as seen in plan view and an expanded portion (12) in communication with the magnet accommodating portion, and in the resin injecting step, at least a part of the end portion of the resin injecting portion is inserted into the expanded portion.

In the resin filling method for a magnet embedded core according to the third aspect, while configuration is made such that the end portion of the resin injecting portion is inserted into the magnet insertion hole beyond the axial end surface of the permanent magnet inserted in the magnet insertion hole, a gap between the side surface (inner peripheral surface) of the permanent magnet and an inner surface of the magnet insertion hole (inner peripheral surface excluding the expanded portion) can be reduced, whereby deterioration of the magnetic properties of the permanent magnet can be suppressed while the permanent magnet can be fixed in the magnet insertion hole accurately.

According to a fourth aspect of the present invention, with regard to any one of the first to third aspects, in the resin injecting step, the axial end surface (4a) of the permanent magnet adjacent to the resin injecting portion is positioned on a same plane as an axial end surface (2b) of the laminated iron core around the magnet insertion hole.

In the resin filling method for a magnet embedded core according to the fourth aspect, the direct flow of the resin from the end portion of the resin injecting portion to the axial end surface of the permanent magnet can be suppressed even more reliably, and thus, the permanent magnet can be fixed in the magnet insertion hole even more accurately.

According to a fifth aspect of the present invention, there is provided a resin filling device for a magnet embedded core (1), for embedding a permanent magnet (4) inserted in a magnet insertion hole (3) provided in a laminated iron core for a motor core with a resin, the device comprising: a first mold (21) and a second mold (22) provided so as to face each other to sandwich axial ends of the laminated iron core therebetween and thereby fix the laminated iron core; and a resin injecting portion (47) provided in the first mold or the second mold for injecting the resin into the magnet insertion hole, wherein the resin injecting portion includes an end portion (47a) configured to be inserted into the magnet insertion hole beyond an axial end surface (4a) of the permanent magnet inserted in the magnet insertion hole.

Effect of the Invention

As described above, according to the present invention, it is possible to fix the permanent magnet in the magnet insertion hole accurately by filling a resin, and to suppress generation of a burr protruding more outward than the axial end surface of the rotor after the resin is filled.

DESCRIPTION OF THE PREFERRED EMBODIMENT(S)

Embodiments of the present invention are described in the following with reference to the appended drawings.

Figure 1:
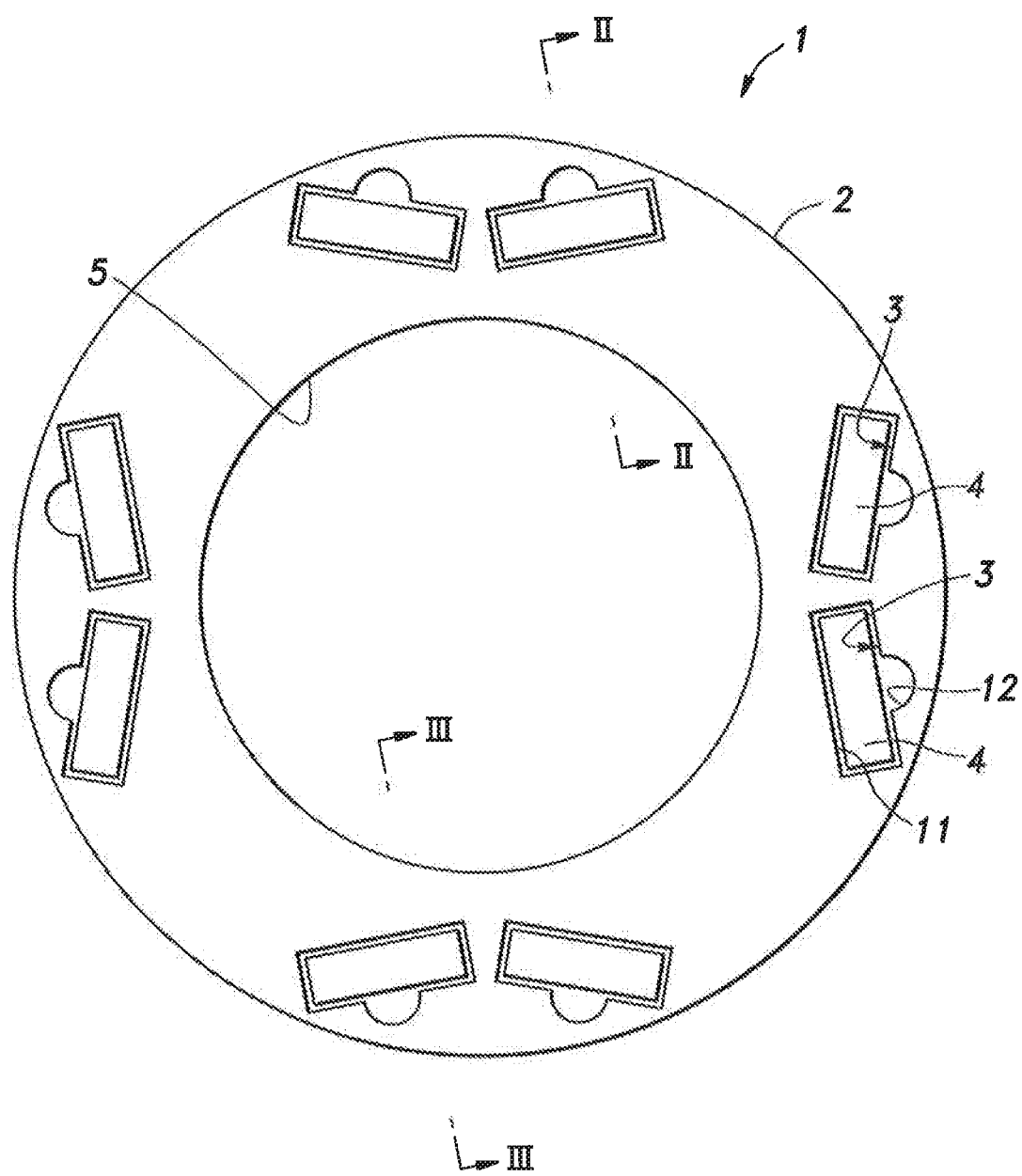
FIG. 1 is a plan view of a magnet embedded rotor according to an embodiment.
Figure 2:
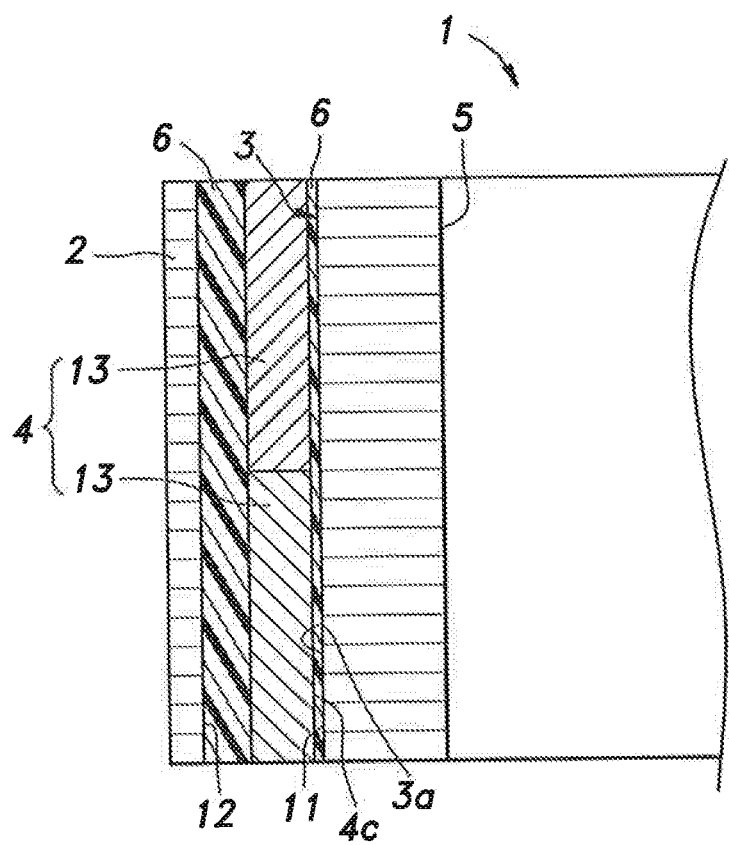
FIG. 2 is a sectional view taken along line II-II in FIG. 1.
Figure 3:
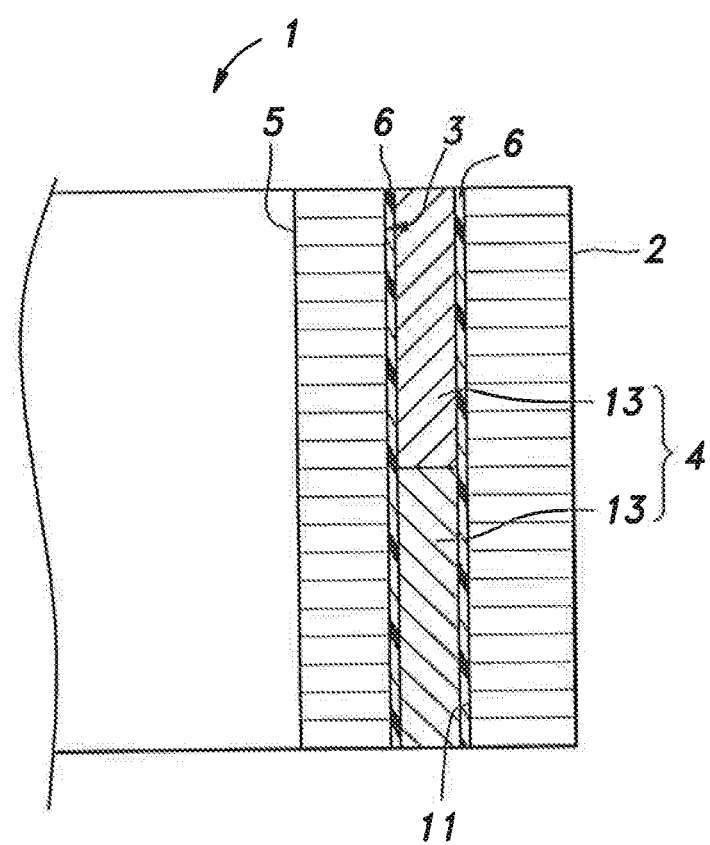
FIG. 3 is a sectional view taken along line III-III in FIG. 1.

FIG. 1 is a plan view of a magnet embedded rotor 1 according to an embodiment of the present invention, and FIGS. 2 and 3 are sectional views taken along lines II-II and III-III in FIG. 1, respectively.

As shown in FIG. 1, a magnet embedded rotor (magnet embedded core) 1 is a constituent part of a motor or the like, and includes a rotor core (motor core) 2 consisting of a laminated iron core, and permanent magnets 4 accommodated respectively in a plurality of magnet insertion holes 3 formed in the rotor core 2. The laminated iron core constituting the rotor core 2 is formed by stacking a plurality of electromagnetic steel plates connected together by a known connecting method (crimping, gluing, laser-welding, etc.). The rotor core 2 is substantially in a shape of an annular ring as seen in plan view, and is provided with an axial hole 5 opened at the center thereof, into which a shaft not shown in the drawing is securely fitted.

The magnet insertion holes 3 have an identical shape to one another and are provided to extend through the rotor core 2 in the axial direction. Each magnet insertion hole 3 includes a magnet accommodating portion 11 having a substantially rectangular shape as seen in plan view and a substantially semicircular gate inserting portion (expanded portion) 12 connected to a central portion of one side of the magnet accommodating portion 11 adjacent to the outer circumference. In this embodiment, an example is shown in which pairs of the magnet insertion holes 3 are arranged at equal intervals in the circumferential direction of the rotor core 2, but the shape, number, and arrangement of the magnet insertion holes 3 may be altered in various ways without being limited to this embodiment.

Each permanent magnet 4 has a substantially rectangular parallelepiped shape, and as shown in FIGS. 2 and 3, is inserted into the magnet accommodating portion 11 of one of the magnet insertion holes 3 with a prescribed gap and fixed by a resin 6 (here, thermoplastic resin) filled in the magnet insertion hole 3. Each permanent magnet 4 is constituted of a plurality of (here, two) magnets 13 (e.g., ferrite-based sintered magnets, neodymium magnets, etc.) inserted in a single magnet insertion hole 3 in series in the axial direction, but the present invention is not limited to this and a single magnet may be used. In FIGS. 2 and 3, the axial length of the permanent magnet 4 is shown to be the same as the axial length of the magnet insertion hole 3, but in practice, the axial length of the permanent magnet 4 is set to be slightly smaller than that of the magnet insertion hole 3. Further, in FIGS. 2 and 3, the gap between the inner surface of the magnet accommodating portion 11 and the side surface of the permanent magnet 4 is shown larger than it actually is.

Figure 4:
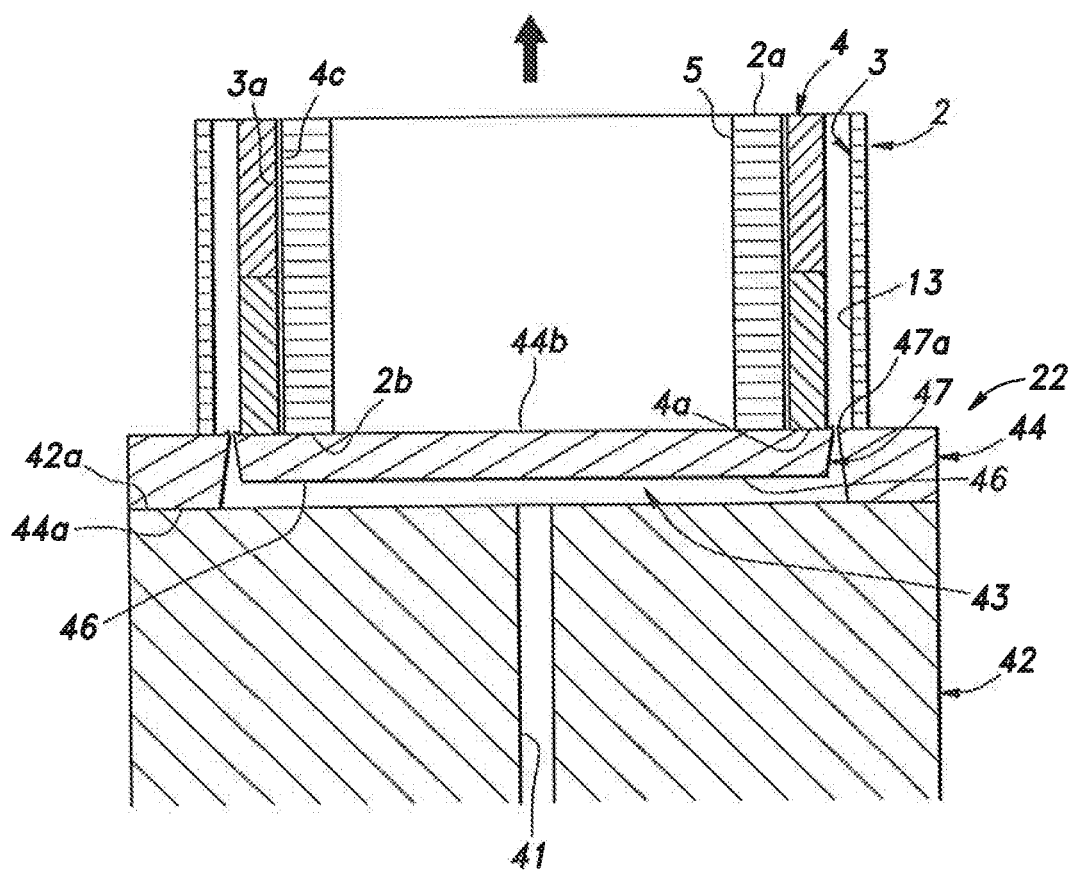
FIG. 4 is a sectional view showing a first state of a resin filling device for the magnet embedded rotor according to the embodiment.
Figure 5:
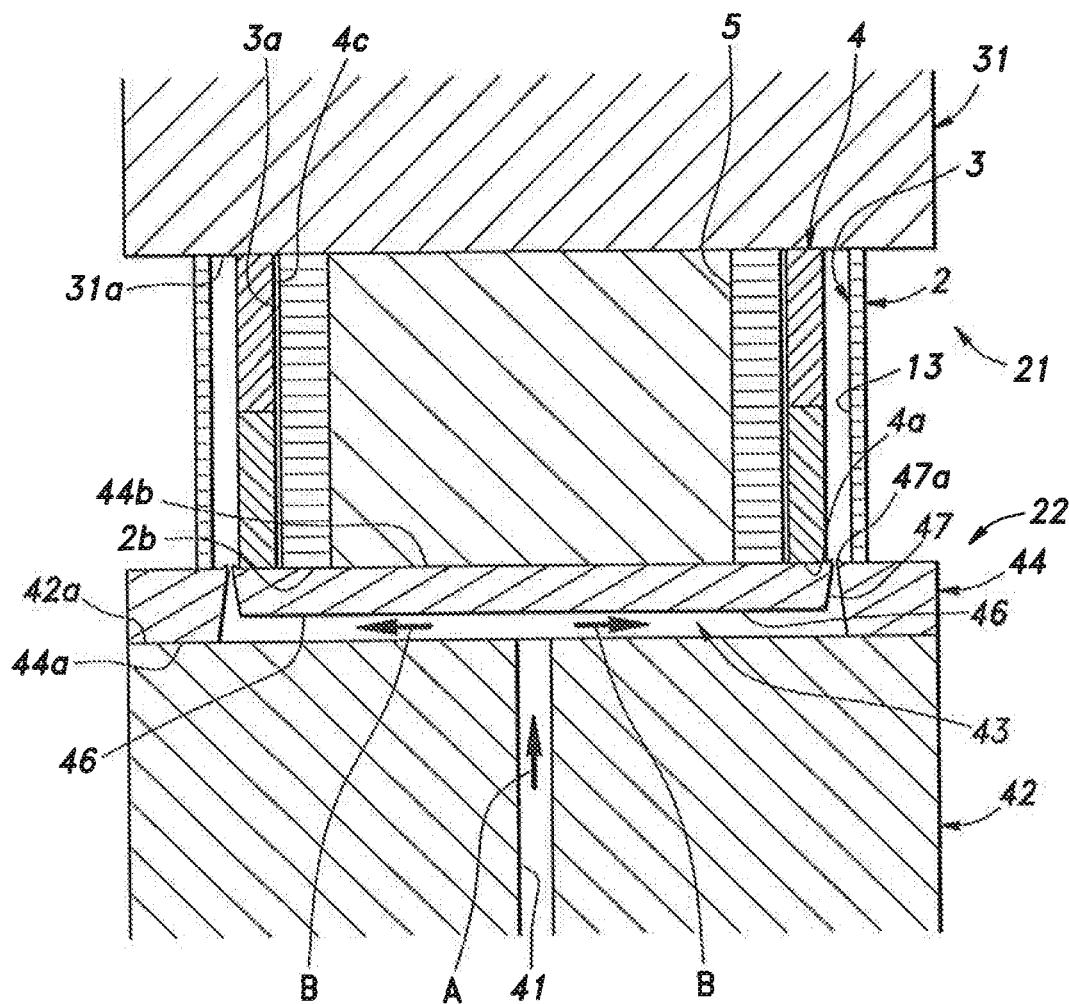
FIG. 5 is a sectional view showing a second state of the resin filling device for the magnet embedded rotor according to the embodiment.
Figure 6:
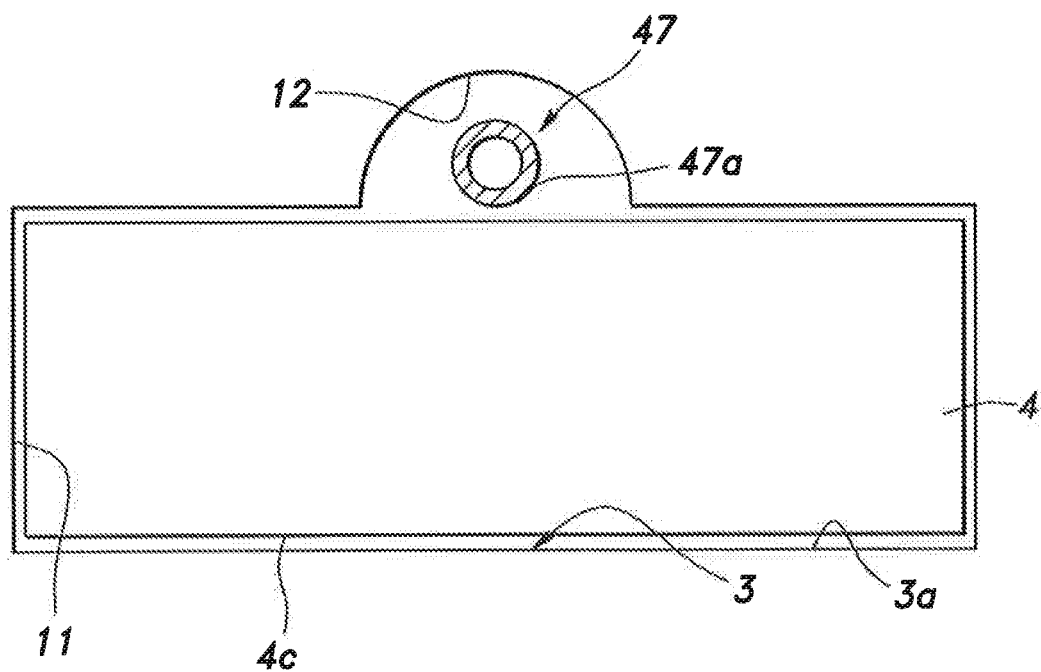
FIG. 6 is a plan view showing an arrangement of a gate portion when the resin is filled according to the embodiment.
Figure 7:
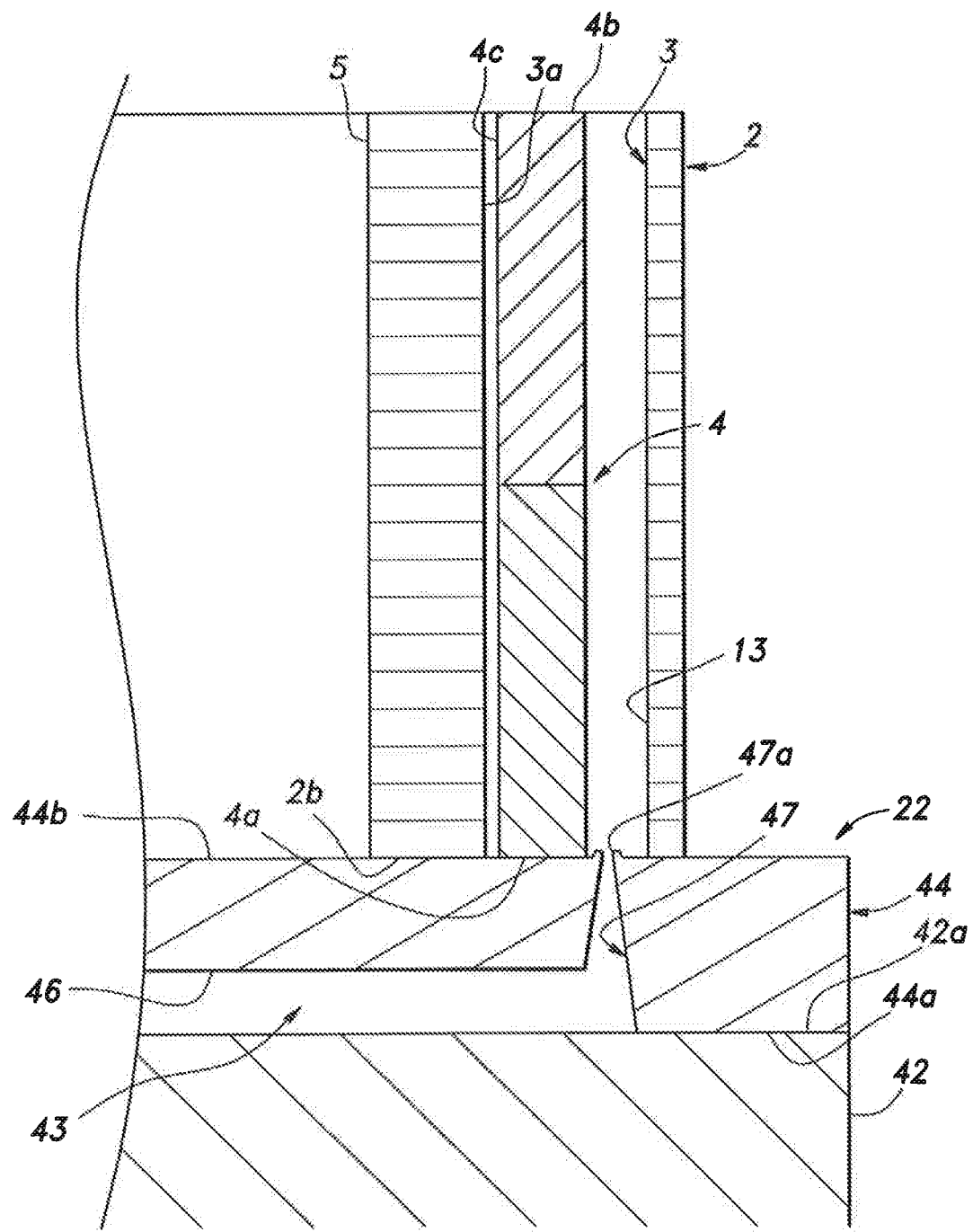
FIG. 7 is a sectional view showing a part around the gate portion when the resin is filled according to the embodiment.
Figure 8:
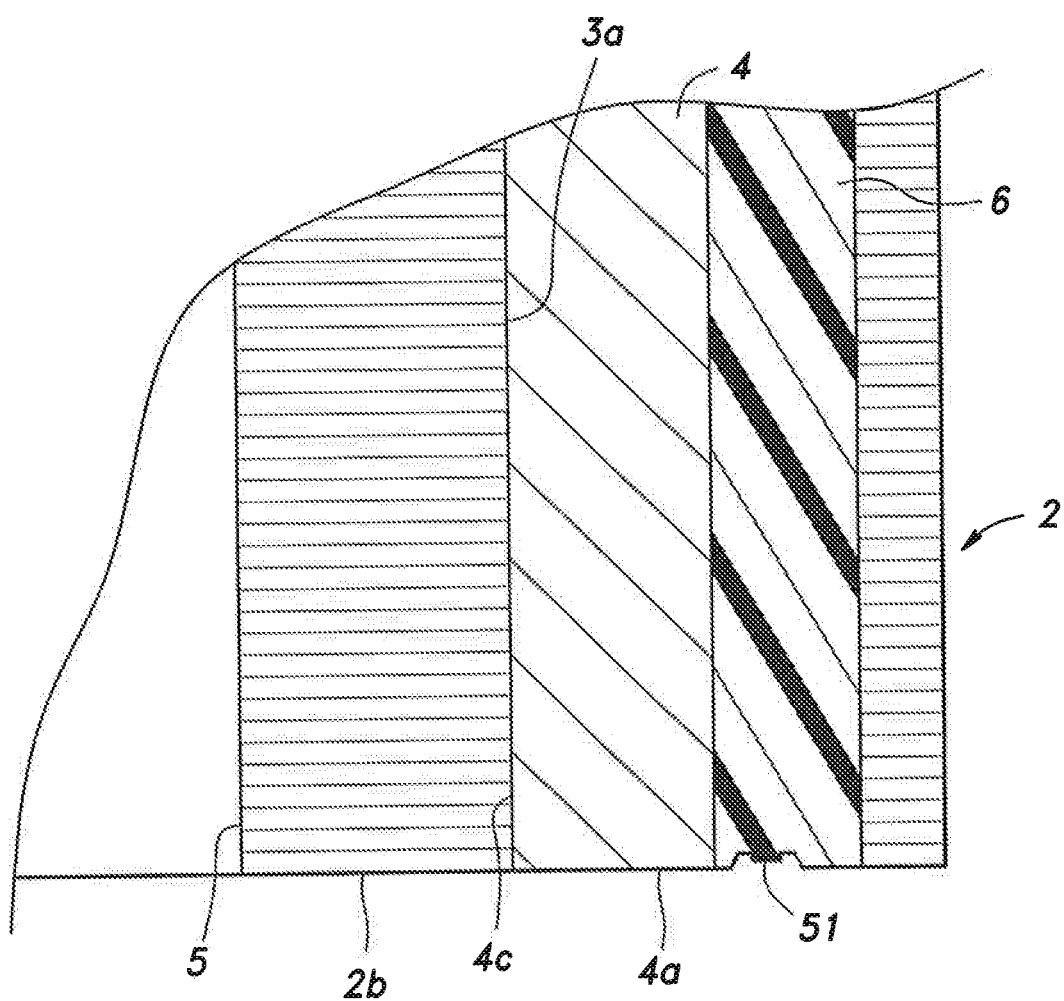
FIG. 8 is a sectional view showing a part around the gate position after the resin is filled according to the embodiment.

FIG. 4 and FIG. 5 are sectional views respectively showing a first state and a second state of the resin filling device 20 for the magnet embedded rotor 1, FIG. 6 is a plan view showing an arrangement of a gate portion when the resin is filled, FIG. 7 is a sectional view showing a part around the gate portion when the resin is filled, and FIG. 8 is a sectional view showing a part around the gate position after the resin is filled.

As shown in FIG. 4 and FIG. 5, the resin filling device 20 is an injection molding device for embedding the permanent magnets 4 accommodated in the magnet insertion holes 3 provided in the rotor core 2 with a resin, and includes an upper mold (first mold) 21 and a lower mold (second mold) 22 disposed to face each other vertically. Here, the upper mold 21 located at an upper position is configured to be stationary, while the lower mold 22 located at a lower position is configured to be movable, but the present invention is not limited to this, and the arrangement (direction) of the resin filling device 20 may be varied and either one of the two molds may be stationary or movable.

The upper mold 21 includes an upper mold main body 31 formed with an abutting surface 31a to abut against an upper surface 2a of the rotor core 2, and a holding block 32 protruding downward from a lower portion of the upper mold main body 31 formed with the abutting surface 31a. The holding block 32 has a shape (here, substantially cylindrical shape) and a size (outer diameter) such that it can be inserted into the axial hole 5 of the rotor core 2.

The lower mold 22 includes a lower mold main body 42 formed with a sprue 41 that is a passage for guiding resin from a nozzle of an injection molding machine not shown in the drawings, and a runner plate 44 consisting of a substantially planar plate, the runner plate 44 being attached to an upper surface 42a of the lower mold main body 42 so as to form, in cooperation with the lower mold main body 42, runner portions 43 connected to a downstream end of the sprue 41. The sprue 41 extends through the lower mold main body 42 vertically, and guides the resin from the bottom to the top of the lower mold 22.

The runner portions 43 include a plurality of (here, eight) branch passages 46 that are connected to the downstream end (here, upper end) of the sprue 41 and extend horizontally and radially from a center side of the rotor core 2 toward the respective magnet insertion holes 3. These branch passages 46 are defined by grooves provided in a lower surface 44a of the runner plate 44 and the upper surface 42a of the lower mold main body 42 covering the grooves. A downstream end (here, outer end) of each branch passage 46 is provided with a gate portion (resin injecting portion) 47.

Each gate portion 47 is formed to make a passage tapered upward from the downstream end of the corresponding runner portion 43, and an end portion 47a thereof forming a downstream end opens out in an upper surface 44h of the runner plate 44 at a position opposing the corresponding magnet insertion hole 3. The end portion 47a of the gate portion 47 is provided to protrude from the upper surface 44b of the runner plate 44 (at least a part around the gate opening position of the end portion 47a).

When the resin is filled into the magnet insertion holes 3 of the rotor core 2 by the resin filling device 20, as shown in FIG. 4, the rotor core 2 having the permanent magnets 4 accommodated in the respective magnet insertion holes 3 is placed on the upper surface 44b of the runner plate 44. At this time, the end portion 47a of each gate portion 47 is inserted upward into the gate inserting portion 12 of the corresponding magnet insertion hole 3 beyond an end surface 4a (here, lower surface) of the corresponding permanent magnet 4, as shown in FIG. 5 and FIG. 7. Thus, as seen in plan view (for example, see FIG. 6), at least the end portion 47a of each gate portion 47 is disposed at a position not overlapping with the end surface 4a of the corresponding permanent magnet 4 (namely, at a position where insertion into the magnet insertion hole 3 beyond the end surface 4a is possible).

The depth of insertion of the end portion 47a into the magnet insertion hole 3 may be varied in various ways, but preferably, a depth of about 0.1 mm should be ensured as a lower limit thereof. In the present embodiment, the end surface 4a of each permanent magnet 4 substantially coincides with the lower surface 2b of the rotor core 2 (the upper surface 44b of the runner plate 44), and therefore, the end portion 47a of each gate portions 47 protrudes upward from the upper surface 44b of the runner plate 44 by at least about 0.1 mm. In a structure where the end surface 4a of each permanent magnet 4 is located more inside than the end surface of the corresponding magnet insertion hole 3 (here, the lower surface 2b of the rotor core 2), the end portion 47a (upper end) needs to be inserted further into the magnet insertion hole 3 beyond the end surface 4a of the permanent magnet 4, and in this case, it should be preferably ensured that the depth of insertion of the end portion 47a (upper end) with the end surface 4a of the permanent magnet 4 being a reference (zero) is at least about 0.1 mm.

Subsequently, by moving up the lower mold 22 from the state shown in FIG. 4, the rotor core 2 is fixed by being sandwiched vertically between the upper mold 21 and the lower mold 22, as shown in FIG. 5 (fixing step). At this time, in the upper mold 21, the holding block 32 is fitted into the axial hole 5 of the rotor core 2, and the abutting surface of the upper mold main body 31 abuts against the upper surface 2a of the rotor core 2. Thereby, the rotor core 2 is vertically clamped between the abutting surface 31a of the upper mold main body 31 and the upper surface 44b of the runner plate 44.

Thereafter, when the injection molding machine not shown in the drawings is operated to cause the resin molten by heat to flow into the sprue 41 with a prescribed pressure, the resin that has flowed into the sprue 41 as shown by arrow A in FIG. 5 flows through the runner portions 43 (branch passages 46) as shown by arrows B in FIG. 5, and is injected into the magnet insertion holes 3 via the gate portions 47 (resin injecting step). At this time, because the end portion 47a of each gate portion 47 is inserted in the corresponding magnet insertion hole 3 beyond the end surface 4a of the permanent magnet 4 inserted in the magnet insertion hole 3, a direct flow of the resin from the end portion 47a of the gate portion 47 to the end surface 4a of the permanent magnet 4 (namely, a flow of the resin that may have a significant influence on occurrence of tilting of the permanent magnet 4 in the magnet insertion hole 3) is suppressed, and occurrence of tilting of the permanent magnet 4 due to the flow (pressure) of the resin from the side of the end surface 4a of the permanent magnet 4 can be suppressed.

Further, due to the pressure of the resin injected into each magnet insertion hole 3 from the end portion 47a of the corresponding gate portion 47, an inside side surface 4c of the permanent magnet 4 located opposite to the gate portion 47 is pressed toward an inside inner surface 3a of the magnet insertion hole 3 located opposite to the gate portion 47, and this allows the position of the permanent magnet 4 fixed in the magnet insertion hole 3 to be determined accurately. It is to be noted that FIG. 2, FIG. 7, etc., illustrate a state in which a layer of the resin 6 is interposed between the inside side surface 4c of the permanent magnet 4 and the inside inner surface 3a of the magnet insertion hole 3, but preferably, the side surface 4c of the permanent magnet 4 and the inner surface 3a of the magnet insertion hole 3 are in close contact with each other as shown in FIG. 8.

Once the magnet insertion holes 3 are filled with the resin, the resin 6 in the magnet insertion holes 3 is cooled and cured. Thereafter, the lower mold 22 is moved down to the position shown in FIG. 4 again, and the rotor core 2 (magnet embedded rotor 1) filled with the resin is taken out of the resin filling device 20. In this embodiment, the runner plate 44 is fixed to the lower mold main body 42, and the rotor core 2 filled with the resin alone is taken out of the resin filling device 20. However, the present invention is not limited to this, and the runner plate 44 may be detachably provided to the lower mold main body 42, such that the rotor core 2 filled with the resin may be taken out of the resin filling device 20 together with the runner plate 44.

In the resin filling device 20, because configuration is made such that when the resin is filled, the end portion 47a of each gate portion 47 is inserted into the corresponding magnet insertion hole 3 beyond the end surface 4a of the permanent magnet 4 inserted in the magnet insertion hole 3, a resin residue Si of the gate portion 47 can be formed more inward than the lower surface 2b of the rotor core 2 in the magnet embedded rotor 1 after the resin is filled, as shown in FIG. 8. Therefore, generation of a burr protruding more outward than the lower surface (axial end surface) 2b of the rotor core 2 is suppressed.

As described in the foregoing, according to the aforementioned resin filling device 20 and the resin filling method for the magnet embedded rotor 1 using the same, the permanent magnets 4 can be fixed accurately in the magnet insertion holes 3 and generation of a burr protruding more outward than the axial end surface of the rotor core 2 after the resin is filled can be suppressed.

It is to be noted that in this embodiment, the entire areas of end surfaces 4a, 4b (lower surface, upper surface) of each permanent magnet 4 after the filling of the resin are exposed from upper and lower openings of the magnet insertion hole 3, but a configuration in which the entire area or a partial area of at least one of the end surfaces 4a, 4b of the permanent magnet 4 is covered with the resin 6 (namely, a configuration in which the axial length of the permanent magnet 4 is smaller than the axial length of the magnet insertion hole 3) is also possible.

Figure 9:
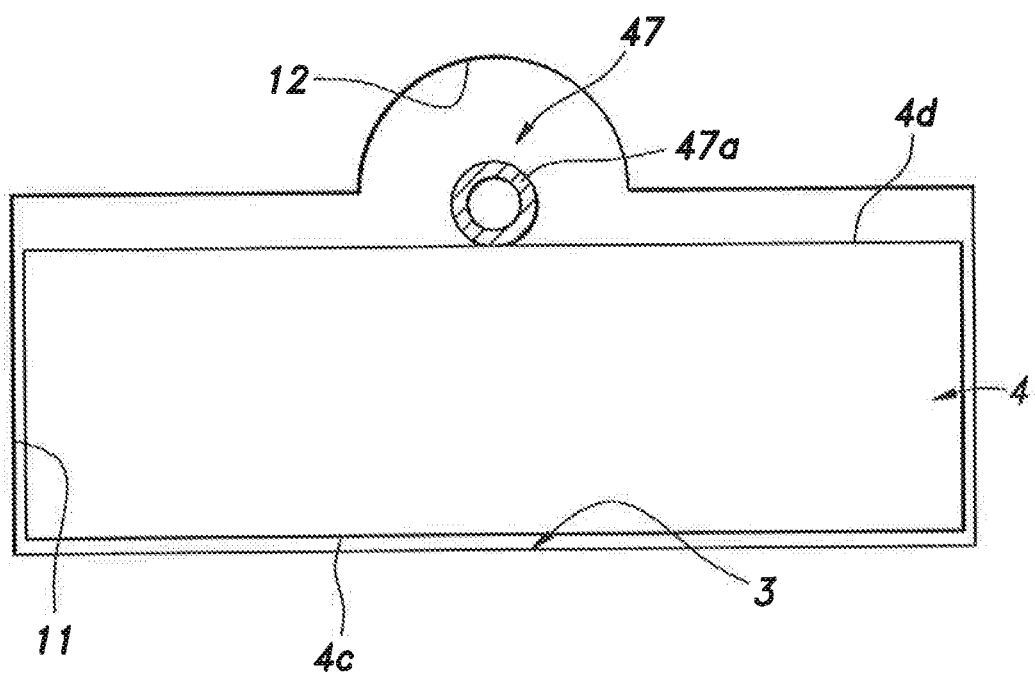
FIG. 9 is a diagram showing a first modification of the arrangement of the gate portion when the resin is filled as shown in FIG. 6.
Figure 10:
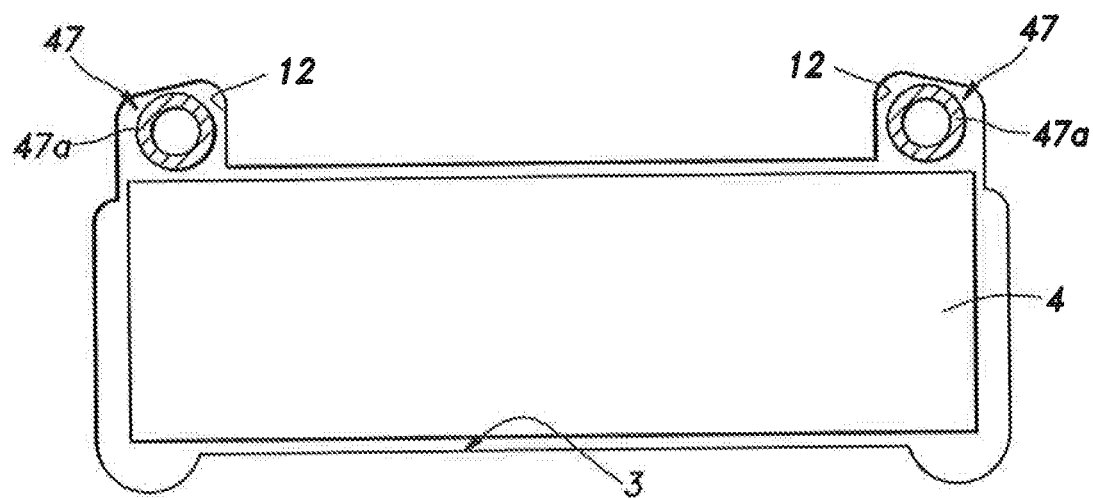
FIG. 10 is a diagram showing a second modification of the arrangement of the gate portion when the resin is filled as shown in FIG. 6.

FIG. 9 and FIG. 10 show first and second modifications of the arrangement of the gate portion when the resin is filled as shown in FIG. 6.

In the above-described example, configuration was made such that the end portion 47a of each gate portion 47 is inserted into the gate inserting portion 12 of the corresponding magnet insertion hole 3, but as shown in FIG. 9, for example, it is also possible to make configuration such that at least a part of the end portion 47a of the gate portion 47 is inserted in the magnet accommodating portion 11. In this case, by arranging the end portion 47a of the gate portion 47 to abut against an outside side surface 4d of the permanent magnet 4, the end portion 47a restricts movement of the permanent magnet 4 in the magnet insertion hole 3 when the resin is filled, and this provides an advantage that the permanent magnet 4 can be fixed accurately in the magnet insertion hole 3. In some cases, it is possible in the example of FIG. 9 to omit the gate inserting portion 12 (namely, make the magnet insertion hole 3 rectangular) and to insert the end portion 47a of the gate portion 47 between the inner surface of the magnet insertion hole 3 and the side surface of the permanent magnet 4.

Further, in the above-described example, a configuration that uses a single gate portion 47 was shown, but as shown in FIG. 10, for example, configuration may be made such that a plurality of (two or more) gate portions 47 are provided. In this case, it is preferred that the end portions 47a of a pair of (at least a pair of) gate portions 47 are arranged on one side of the permanent magnet 4 (here, on the radially outer side) at symmetric positions (here, positions symmetric in the circumferential direction) with respect to the permanent magnet 4 (for example, an imaginary line passing through the center position thereof). Thereby, it is possible to suppress occurrence of tilting of the permanent magnet 4 due to the pressure of the resin injected into the magnet insertion hole 3 from the plurality of gate portions 47, to thereby fix the permanent magnet 4 accurately.

The present invention has been described in the foregoing based on the specific embodiments thereof, but these embodiments are for illustrative purposes only, and the present invention is not limited to these embodiments. For example, in the above embodiment, description was made of an example using injection molding, but another molding technique (for example, transfer molding, etc.) may be used in the present invention without being limited to the embodiment. Further, the filling of the resin into the magnet insertion holes of the rotor core is not limited to the structure in which the resin is injected from the lower mold, and may be realized by a structure in which the resin is injected from the upper mold. Also, the gate portion does not have to be located at a radially outer side of the permanent magnet, and may be located at a radially inner side or, in some cases, on one side in the circumferential direction or at a corner portion of the rectangular magnet insertion hole. The resin for fixing the permanent magnets is not limited to a thermoplastic resin, and other known resins such as a thermosetting resin, a two-part curable resin (e.g., two-part epoxy resin), a moisture-curable resin, etc. may be used. Further, the present invention is not limited to a rotor core, and may be applied to a stator core. Not all of the structural elements of the resin filling method and the resin filling device for a magnet embedded core shown in the above embodiments regarding the present invention are necessarily indispensable, and they may be selectively used as appropriate at least without departing from the scope of the present invention.

GLOSSARY 1 magnet embedded rotor (magnet embedded core)
2 rotor core (laminated iron core)
2b lower surface
3 magnet insertion holes
4 permanent magnets
4a end surface
4d side surface
5 axial hole
6 resin
11 magnet accommodating portion
12 gate inserting portion (expanded portion)
3 magnet
20 resin filling device
21 upper mold (first mold)
22 lower mold (second mold)
31 upper mold main body
32 holding block
41 sprue
42 lower mold main body
43 runner portion
44 runner plate
46 branch passage
47 gate portion (resin injecting portion)
47a end portion

The invention claimed is:

1. A resin filling method for a magnet embedded core, for embedding a permanent magnet inserted in a magnet insertion hole provided in a laminated iron core for a motor core with a resin, the method comprising:
   a fixing step of sandwiching the laminated iron core at axial ends thereof between a first mold and a second mold disposed to face each other; and
   a resin injecting step of injecting the resin into the magnet insertion hole from a resin injecting portion of the first mold or the second mold,
   wherein in the resin injecting step, an end portion of the resin injecting portion protrudes from a surface of the first or second mold in contact with the laminated iron core and into the magnet insertion hole beyond an end surface of the permanent magnet inserted in the magnet insertion hole.

2. The resin filling method for a magnet embedded core according to claim 1, wherein the end portion of the resin injecting portion abuts against a side surface of the permanent magnet in the resin injecting step.

3. The resin filling method for a magnet embedded core according to claim 1, wherein the magnet insertion hole includes a magnet accommodating portion formed to conform to an outer shape of the permanent magnet as seen in plan view and an expanded portion in communication with the magnet accommodating portion, and in the resin injecting step, at least a part of the end portion of the resin injecting portion is inserted into the expanded portion.

4. The resin filling method for a magnet embedded core according to claim 1, wherein in the resin injecting step, the end surface of the permanent magnet adjacent to the resin injecting portion is positioned on a same plane as an axial end surface of the laminated iron core around the magnet insertion hole.

5. A resin filling device for a magnet embedded core, for embedding a permanent magnet inserted in a magnet insertion hole provided in a laminated iron core for a motor core with a resin, the device comprising:

a first mold and a second mold provided so as to face each other to sandwich axial ends of the laminated iron core therebetween and thereby fix the laminated iron core; and a resin injecting portion of the first mold or the second mold for injecting the resin into the magnet insertion hole, wherein the resin injecting portion includes an end portion configured to protrude from a surface of the first or second mold in contact with the laminated iron core and into the magnet insertion hole beyond an end surface of the permanent magnet inserted in the magnet insertion hole.

6. The resin filling method for a magnet embedded core according to claim 2, wherein the magnet insertion hole includes a magnet accommodating portion formed to conform to an outer shape of the permanent magnet as seen in plan view and an expansion portion in communication with the magnet accommodating portion, and in the resin injecting step, at least a part of the distal end portion of the resin injecting portion is inserted into the expansion portion.

7. The resin filling method for a magnet embedded core according to claim 2, wherein in the resin injecting step, the end surface of the permanent magnet adjacent to the resin injecting portion is positioned on a same plane as an axial end surface of the laminated iron core around the magnet insertion hole.

8. The resin filling method for a magnet embedded core according to claim 3, wherein in the resin injecting step, the end surface of the permanent magnet adjacent to the resin injecting portion is positioned on a same plane as an axial end surface of the laminated iron core around the magnet insertion hole.

9. The resin filling method for a magnet embedded core according to claim 6, wherein in the resin injecting step, the end surface of the permanent magnet adjacent to the resin injecting portion is positioned on a same plane as an axial end surface of the laminated iron core around the magnet insertion hole.

* * * * *